(12) United States Patent
Barrick et al.

(10) Patent No.: US 9,928,128 B2
(45) Date of Patent: Mar. 27, 2018

(54) IN-PIPE ERROR SCRUBBING WITHIN A PROCESSOR CORE

(71) Applicant: International Business Machines Corporation, Armonk, NY (US)

(72) Inventors: Brian D. Barrick, Pflugerville, TX (US); James W. Bishop, Newark Valley, NY (US); Marcy E. Byers, Rochester, MN (US); Sundeep Chadha, Austin, TX (US); Niels Fricke, Herrenberg (DE); Dung Q. Nguyen, Austin, TX (US); David R. Terry, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 15/088,315

(22) Filed: Apr. 1, 2016

(65) Prior Publication Data

US 2017/0286202 A1 Oct. 5, 2017

(51) Int. Cl.
*G06F 11/10* (2006.01)
*G06F 11/07* (2006.01)
(Continued)

(52) U.S. Cl.
CPC ........ *G06F 11/0724* (2013.01); *G06F 9/3855* (2013.01); *G06F 11/0793* (2013.01);
(Continued)

(58) Field of Classification Search
CPC .... G06F 9/30; G06F 9/30003; G06F 9/30098; G06F 9/3863; G06F 9/3869; G06F 11/08; G06F 11/10; G06F 11/106; G06F 11/1064
See application file for complete search history.

(56) References Cited

U.S. PATENT DOCUMENTS 5,298,895 A    3/1994  Van Maren
5,860,014 A *  1/1999  Cheong ................ G06F 9/3861
                                                  710/260
(Continued)

FOREIGN PATENT DOCUMENTS

EP    2521412 A1   11/2012
GB    2503612 A    1/2014
WO    0227480 A1   4/2002

OTHER PUBLICATIONS

Weaver, Christopher, et al.; 'Techniques to Reduce the Soft Error Rate of a High-Performance Microprocessor.' In ACM SIGARCH Computer Architecture News, vol. 32, No. 2, pp. 264. IEEE Computer Socuety, 2004.

*Primary Examiner* — Joseph O Schell
(74) *Attorney, Agent, or Firm* — Law Office of Jim Boice

(57) ABSTRACT

A supervisory hardware device in a processor core detects a flush instruction that, when executed, flushes content of one or more general purpose registers (GPRs) within the processor core. The content of the one or more GPRs is moved to a history buffer (HB) and an instruction sequencing queue (ISQ) within the processor core, where the content includes data, an instruction tag (iTag) that identifies an instruction that generated the data, and error correction code (ECC) bits for the data. In response to receiving a restore instruction, the supervisory hardware device error checks the data in the ISQ using the ECC bits stored in the ISQ. In response to detecting an error in the data in the ISQ, the supervisory hardware device sends the data and the ECC bits from the ISQ to an ECC scrubber to generate corrected data, which is restored into the one or more GPRs.

15 Claims, 5 Drawing Sheets

(51) Int. Cl.
    *G06F 9/38*     (2018.01)
    *G06F 9/30*     (2018.01)
    *G06F 11/08*    (2006.01)

(52) U.S. Cl.
    CPC ........ *G06F 11/106* (2013.01); *G06F 11/1064* (2013.01); *G06F 9/30* (2013.01); *G06F 9/30003* (2013.01); *G06F 9/30098* (2013.01); *G06F 11/08* (2013.01)

(56) References Cited

U.S. PATENT DOCUMENTS

| | | | | |
|---|---|---|---|---|
| 6,587,941 | B1 * | 7/2003 | Flacks | G06F 9/3836 |
| | | | | 712/218 |
| 6,694,427 | B1 * | 2/2004 | Mericas | G06F 9/3802 |
| | | | | 712/227 |
| 7,562,263 | B1 * | 7/2009 | Engelbrecht | G06F 11/10 |
| | | | | 714/15 |
| 8,370,609 | B1 * | 2/2013 | Favor | G06F 9/3808 |
| | | | | 712/225 |
| 9,213,608 | B2 * | 12/2015 | Busaba | G06F 11/1479 |
| 2004/0215886 | A1 * | 10/2004 | Cargnoni | G06F 11/106 |
| | | | | 711/135 |
| 2005/0050304 | A1 | 3/2005 | Mukherjee et al. | |
| 2006/0015683 | A1 * | 1/2006 | Ashmore | G06F 1/3203 |
| | | | | 711/113 |
| 2015/0006834 | A1 | 1/2015 | Dulloor et al. | |
| 2015/0120978 | A1 | 4/2015 | Kalyanasundharam et al. | |
| 2015/0169420 | A1 * | 6/2015 | Shapira | G06F 12/1045 |
| | | | | 714/6.2 |
| 2017/0177368 | A1 * | 6/2017 | DeHon | G06F 9/30101 |

\* cited by examiner

IN-PIPE ERROR SCRUBBING WITHIN A PROCESSOR CORE

BACKGROUND

The present disclosure relates to the field of processors, and more specifically to the field of processor cores. Still more specifically, the present disclosure relates to correcting errors in data stored in a history buffer.

SUMMARY

In an embodiment of the present invention, a method and/or computer program product corrects errors in data within a processor core. A supervisory hardware device in a processor core detects a flush instruction. The flush instruction, when executed, flushes content of one or more general purpose registers (GPRs) within the processor core. In response to detecting the flush instruction, the supervisory hardware device moves the content of the one or more GPRs to a history buffer (HB) and an instruction sequencing queue (ISQ) within the processor core, where the content includes data, an instruction tag (iTag) that identifies an instruction that generated the data, and error correction code (ECC) bits for the data. The supervisory hardware device subsequently receives a restore instruction that, when executed, repopulates the one or more GPRs with the content. In response to receiving the restore instruction, the supervisory hardware device error checks the data in the ISQ using the ECC bits stored in the ISQ. In response to detecting an error in the data in the ISQ, the supervisory hardware device sends the data and the ECC bits from the ISQ to an ECC scrubber to generate corrected data based on the data having the error. The supervisory hardware device sends the corrected data to an ECC generator, which generates a new set of ECC bits for the corrected data. The supervisory hardware device then loads the corrected data and the new ECC bits into the one or more GPRs.

In an embodiment of the present invention, a processor core includes a supervisory hardware device, a set of general purpose registers (GPRs), a history buffer (HB) mapped to one or more of the GPRs, an instruction sequencing queue (ISQ), an error correction code (ECC) scrubber, an ECC checker, and an ECC generator. The supervisory hardware device: detects a flush instruction that, when executed, flushes content of one or more of the GPRs within the processor core; in response to detecting the flush instruction, moves the content of the one or more GPRs to the HB and the ISQ within the processor core, where the content includes data, an instruction tag (iTag) that identifies an instruction that generated the data, and ECC bits for the data; receives a restore instruction that, when executed, repopulates the one or more GPRs with the content; in response to receiving the restore instruction, error checks the data in the ISQ using the ECC bits stored in the ISQ; in response to detecting an error in the data in the ISQ, sends the data and the ECC bits from the ISQ to the ECC scrubber to generate corrected data based on the data having the error; sends the corrected data to the ECC generator, where the ECC generator generates a new set of ECC bits for the corrected data; and loads the corrected data and the new ECC bits into the one or more GPRs.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
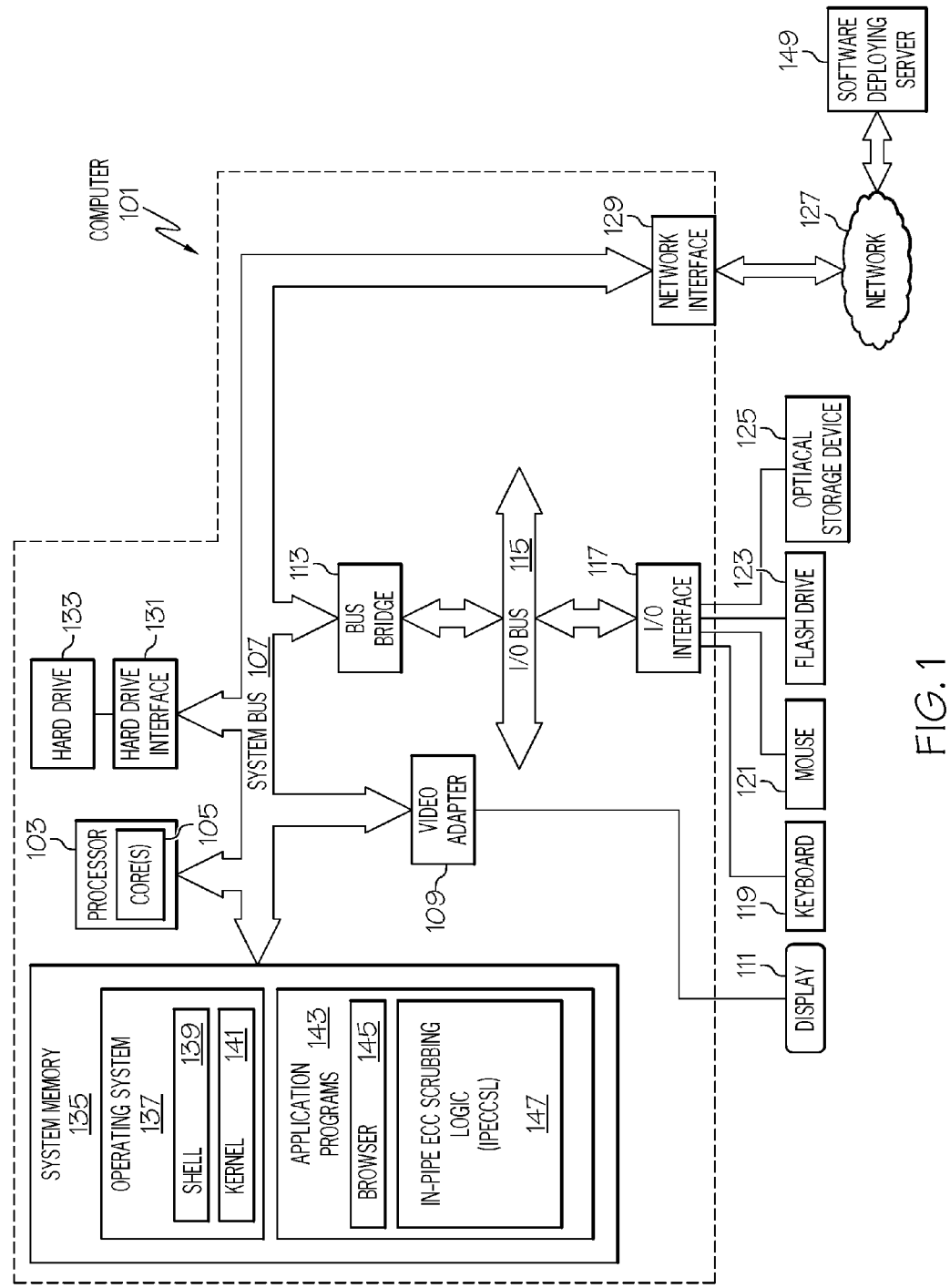
FIG. 1 depicts an exemplary computer system and/or network which may be utilized by the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and particularly to FIG. 1, there is depicted a block diagram of an exemplary computer 101, within which the present invention may be utilized. Note that some or all of the exemplary architecture shown for computer 101 may be utilized by software deploying server 149 shown in FIG. 1.

Computer 101 includes a processor 103, which may utilize one or more processors each having one or more processor cores 105. Processor 103 is coupled to a system bus 107. A video adapter 109, which drives/supports a display 111, is also coupled to system bus 107. System bus 107 is coupled via a bus bridge 113 to an Input/Output (I/O) bus 115. An I/O interface 117 is coupled to I/O bus 115. I/O interface 117 affords communication with various I/O devices, including a keyboard 119, a mouse 121, a Flash Drive 123, and an optical storage device 125 (e.g., a CD or DVD drive). The format of the ports connected to I/O interface 117 may be any known to those skilled in the art of computer architecture, including but not limited to Universal Serial Bus (USB) ports.

Computer 101 is able to communicate with a software deploying server 149 and other devices via network 127 using a network interface 129, which is coupled to system bus 107. Network 127 may be an external network such as the Internet, or an internal network such as an Ethernet or a Virtual Private Network (VPN). Network 127 may be a wired or wireless network, including but not limited to cellular networks, Wi-Fi networks, hardwired networks, etc.

A hard drive interface 131 is also coupled to system bus 107. Hard drive interface 131 interfaces with a hard drive 133. In a preferred embodiment, hard drive 133 populates a system memory 135, which is also coupled to system bus 107. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. Note that while shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a World Wide Web (WWW) client (i.e., computer 101) to send and receive network messages to the Internet using HyperText Transfer Protocol (HTTP) messaging, thus enabling communication with software deploying server 149 and other described computer systems.

Application programs 143 in computer 101's system memory (as well as software deploying server 149's system memory) also include an In-Pipe ECC Scrubbing Logic (IPECCSL) 147. IPECCSL 147 includes code for implementing the processes described below in FIGS. 2-3. In one embodiment, computer 101 is able to download IPECCSL 147 from software deploying server 149, including in an on-demand basis.

The hardware elements depicted in computer 101 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

In a Distributed History Buffer design, when a flush condition is detected, data will be read out of the History Buffers and restored to general purpose registers (GPRs). Once restoring is complete, the restored data in a GPR is available for new dispatching instructions. However, data residing in the History Buffer can experience an error correction code (ECC) error, and thus needs to be fixed before it can be written into the GPR for subsequent use. Previous designs required that the microprocessor be stopped, all threads flushed out, and then the microprocessor to go through a complicated mechanism to read out all the data from register files, scrubbing them one entry at a time. This process is complicated and time consuming.

Figure 2:
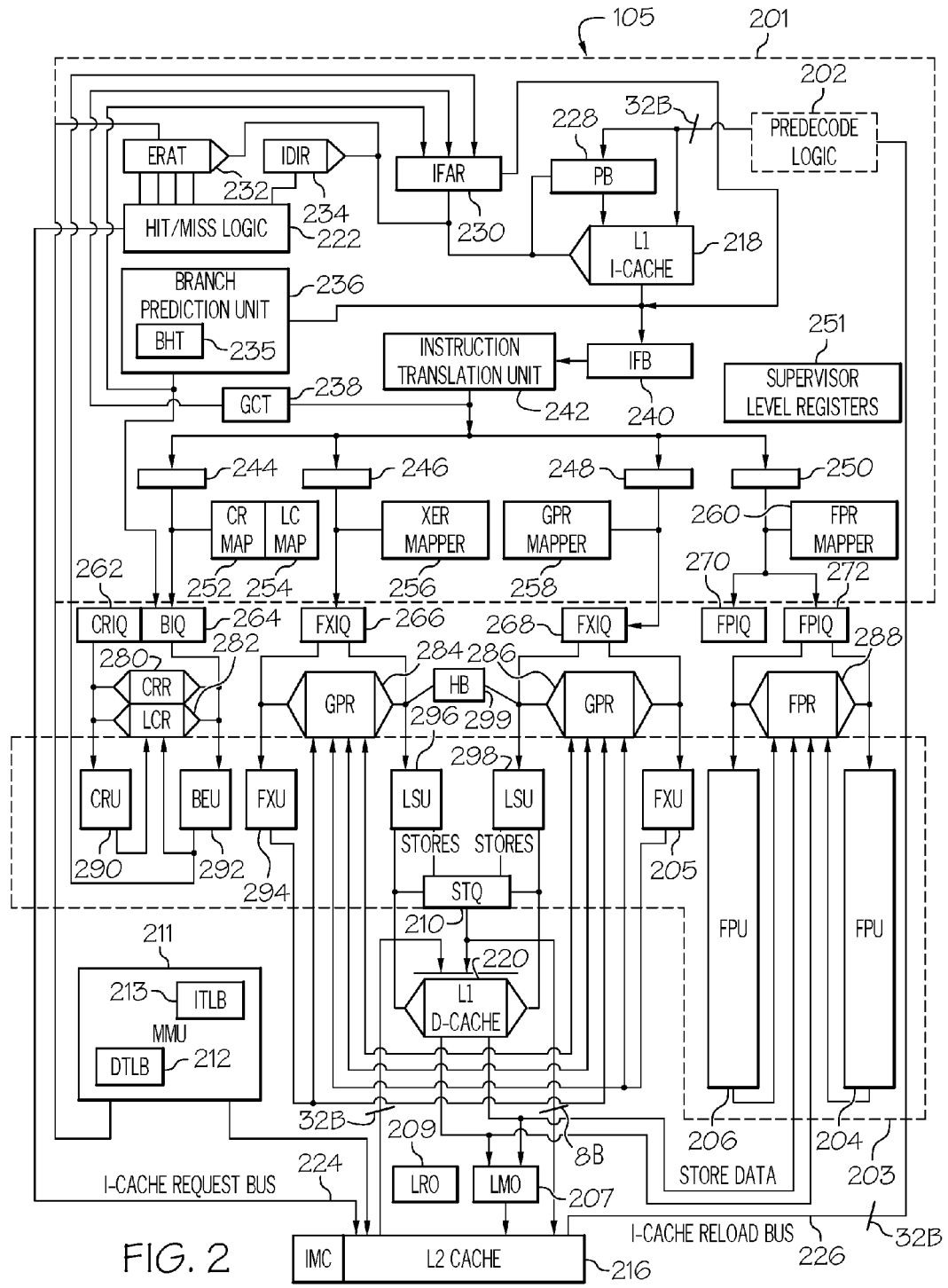
FIG. 2 illustrates additional exemplary detail of a processor core depicted in FIG. 1.

With reference now to FIG. 2, additional exemplary detail of core 105 depicted in FIG. 1 is presented. Core 105 includes an on-chip multi-level cache hierarchy including a unified level two (L2) cache 216 and bifurcated level one (L1) instruction (I) and data (D) caches 218 and 220, respectively. As is well-known to those skilled in the art, caches 216, 218 and 220 provide low latency access to cache lines corresponding to memory locations in system memories (e.g., system memory 135 shown in FIG. 1).

Instructions are fetched for processing from L1 I-cache 218 in response to the effective address (EA) residing in instruction fetch address register (IFAR) 230. During each cycle, a new instruction fetch address may be loaded into IFAR 230 from one of three sources: branch prediction unit (BPU) 236, which provides speculative target path and sequential addresses resulting from the prediction of conditional branch instructions, global completion table (GCT) 238, which provides flush and interrupt addresses, and branch execution unit (BEU) 292, which provides non-speculative addresses resulting from the resolution of predicted conditional branch instructions. Associated with BPU 236 is a branch history table (BHT) 235, in which are recorded the resolutions of conditional branch instructions to aid in the prediction of future branch instructions.

An effective address (EA), such as the instruction fetch address within IFAR 230, is the address of data or an instruction generated by a processor. The EA specifies a segment register and offset information within the segment. To access data (including instructions) in memory, the EA is converted to a real address (RA), through one or more levels of translation, associated with the physical location where the data or instructions are stored.

Within core 105, effective-to-real address translation is performed by memory management units (MMUs) and associated address translation facilities. Preferably, a separate MMU is provided for instruction accesses and data accesses. In FIG. 2, a single MMU 211 is illustrated, for purposes of clarity, showing connections only to Instruction Store Unit (ISU) 201. However, it is understood by those skilled in the art that MMU 211 also preferably includes connections (not shown) to load/store units (LSUs) 296 and 298 and other components necessary for managing memory accesses. MMU 211 includes Data Translation Lookaside Buffer (DTLB) 212 and Instruction Translation Lookaside Buffer (ITLB) 213. Each TLB contains recently referenced page table entries, which are accessed to translate EAs to RAs for data (DTLB 212) or instructions (ITLB 213). Recently referenced EA-to-RA translations from ITLB 213 are cached in EOP effective-to-real address table (ERAT) 232.

If hit/miss logic 222 determines, after translation of the EA contained in IFAR 230 by ERAT 232 and lookup of the real address (RA) in I-cache directory (IDIR) 234, that the cache line of instructions corresponding to the EA in IFAR 230 does not reside in L1 I-cache 218, then hit/miss logic 222 provides the RA to L2 cache 216 as a request address via I-cache request bus 224. Such request addresses may also be generated by prefetch logic within L2 cache 216 based upon recent access patterns. In response to a request address, L2 cache 216 outputs a cache line of instructions, which are loaded into prefetch buffer (PB) 228 and L1 I-cache 218 via I-cache reload bus 226, possibly after passing through optional predecode logic 202.

Once the cache line specified by the EA in IFAR 230 resides in L1 I-cache 218, L1 I-cache 218 outputs the cache line to both branch prediction unit (BPU) 236 and to instruction fetch buffer (IFB) 240. BPU 236 scans the cache line of instructions for branch instructions and predicts the outcome of conditional branch instructions, if any. Following a branch prediction, BPU 236 furnishes a speculative instruction fetch address to IFAR 230, as discussed above, and passes the prediction to branch instruction queue (BIQ) 264 so that the accuracy of the prediction can be determined when the conditional branch instruction is subsequently resolved by branch execution unit 292.

IFB 240 temporarily buffers the cache line of instructions received from L1 I-cache 218 until the cache line of instructions can be translated by instruction translation unit (ITU) 242. In the illustrated embodiment of core 105, ITU 242 translates instructions from user instruction set architecture (UISA) instructions into a possibly different number of internal ISA (IISA) instructions that are directly executable by the execution units of core 105. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 238 to an instruction group, the members of which are permitted to be dispatched and executed out-of-order with respect to one another. Global completion table 238 tracks each instruction group for which execution has yet to be completed by at least one associated EA, which is preferably the EA of the oldest instruction in the instruction group.

Following UISA-to-IISA instruction translation, instructions are dispatched to one of latches 244, 246, 248 and 250, possibly out-of-order, based upon instruction type. That is, branch instructions and other condition register (CR) modifying instructions are dispatched to latch 244, fixed-point and load-store instructions are dispatched to either of latches 246 and 248, and floating-point instructions are dispatched to latch 250. Each instruction requiring a rename register for temporarily storing execution results is then assigned one or more rename registers by the appropriate one of CR mapper 252, link and count (LC) register mapper 254, exception register (XER) mapper 256, general-purpose register (GPR) mapper 258, and floating-point register (FPR) mapper 260.

The dispatched instructions are then temporarily placed in an appropriate one of CR issue queue (CRIQ) 262, branch issue queue (BIQ) 264, fixed-point issue queues (FXIQs) 266 and 268, and floating-point issue queues (FPIQs) 270 and 272. From issue queues 262, 264, 266, 268, 270 and 272, instructions can be issued opportunistically to the execution units of processor 103 (shown in FIG. 1) for execution as long as data dependencies and antidependencies are observed. The instructions, however, are maintained in issue queues 262-272 until execution of the instructions is complete and the result data, if any, are written back, in case any of the instructions need to be reissued.

As illustrated, the execution units of core 105 include an execution subcomponent 203, which includes a CR unit (CRU) 290 for executing CR-modifying instructions, a branch execution unit (BEU) 292 for executing branch instructions, two fixed-point units (FXUs) 294 and 205 for executing fixed-point instructions, two load-store units (LSUs) 296 and 298 for executing load and store instructions, and two floating-point units (FPUs) 206 and 204 for executing floating-point instructions. Each of execution units 290-294 and 204-206 is preferably implemented as an execution pipeline having a number of pipeline stages.

During execution within one of execution units 290-294 and 204-206, an instruction receives operands, if any, from one or more architected and/or rename registers within a register file coupled to the execution unit. When executing CR-modifying or CR-dependent instructions, CRU 290 and BEU 292 access the CR register file 280, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) file 282 contains a count register (CTR), a link register (LR) and rename registers of each, by which BEU 292 may also resolve conditional branches to obtain a path address. General-purpose register files (GPRs) 284 and 286, which are synchronized, duplicate register files, and store fixed-point and integer values accessed and produced by FXUs 294 and 205 and LSUs 296 and 298. Note that floating-point register file (FPR) 288, which like GPRs 284 and 286 may also be implemented as duplicate sets of synchronized registers, contains floating-point values that result from the execution of floating-point instructions by FPUs 206 and 204 and floating-point load instructions by LSUs 296 and 298.

Coupled to GPR 284 and/or GPR 286 is a history buffer (HB) 299, which contains historical data that was once held by GPR 284 and/or GPR 286. That is, GPR 284 and/or GPR 286 hold current (newer data), while HB 299 contains older data that used to be, but no long is, stored within GPR 284 and/or GPR 286.

After an execution unit finishes execution of an instruction, the execution unit notifies GCT 238, which schedules completion of instructions in program order. To complete an instruction executed by one of CRU 290, FXUs 294 and 205 or FPUs 206 and 204, GCT 238 signals the execution unit, which writes back the result data, if any, from the assigned rename register(s) to one or more architected registers within the appropriate register file. The instruction is then removed from the issue queue and once all instructions within its instruction group have been completed, it is removed from GCT 238. Other types of instructions, however, are completed differently.

When BEU 292 resolves a conditional branch instruction and determines the path address of the execution path that should be taken, the path address is compared against the speculative path address predicted by BPU 236. If the path addresses match, no further processing is required. If, however, the calculated path address does not match the predicted path address, BEU 292 supplies the correct path address to IFAR 230. In either event, the branch instruction can then be removed from BIQ 264, and when all other instructions within the same instruction group have completed executing, from GCT 238.

Following execution of a load instruction, the effective address computed by executing the load instruction is translated to a real address by a data ERAT (not illustrated) and then provided to L1 D-cache 220 as a request address. At this point, the load instruction is removed from FXIQ 266 or 268 and placed in load reorder queue (LRQ) 209 until the indicated load is performed. If the request address misses in L1 D-cache 220, the request address is placed in load miss queue (LMQ) 207, from which the requested data is retrieved from L2 cache 216, and failing that, from another core 105 or from system memory. LRQ 209 snoops exclusive access requests (e.g., read-with-intent-to-modify), flushes or kills on interconnect fabric (not shown) against loads in flight, and if a hit occurs, cancels and reissues the load instruction. Store instructions are similarly completed utilizing a store queue (STQ) 210 into which effective addresses for stores are loaded following execution of the store instructions. From STQ 210, data can be loaded into either or both of L1 D-cache 220 and L2 cache 216.

Note that the state of a processor includes stored data, instructions and hardware states at a particular time, and are herein defined as either being "hard" or "soft." The "hard" state is defined as the information within a processor that is architecturally required for a processor to execute a process from its present point in the process. The "soft" state, by contrast, is defined as information within a processor that would improve efficiency of execution of a process, but is not required to achieve an architecturally correct result. In core 105 of FIG. 2, the hard state includes the contents of user-level registers, such as CRR 280, LCR 282, GPRs 284 and 286, FPR 288, as well as supervisor level registers 251. The soft state of core 105 includes both "performance-critical" information, such as the contents of L1 I-cache 218, L1 D-cache 220, address translation information such as DTLB 212 and ITLB 213, and less critical information, such as BHT 235 and all or part of the content of L2 cache 216. Thus, the content of such registers are fixed values that describe a real-time current architecture state register of the processor core 105.

Note that as used to describe core 105 in FIG. 2, L1 denotes lowest level of cache, which is first checked to locate an operator (in the case of an instruction (I) cache) or an operand (in the case of a data (D) cache). If the requisite operand/data is not found within the L1 cache (i.e., a "cache miss"), then the next highest level cache memory (L2 cache) is searched. If there is an L2 cache miss, then the next highest L3 cache (if the system has an L3 level cache) is searched. If there is an L2/L3 cache miss, then system memory is searched for the requisite operand/data. If system memory does not have the needed operand/data (e.g., a page fault), then virtual memory, persistent memory (e.g., a hard drive), and/or a memory cloud (e.g., a network of storage devices) are searched for the needed operand or data.

Figure 3:
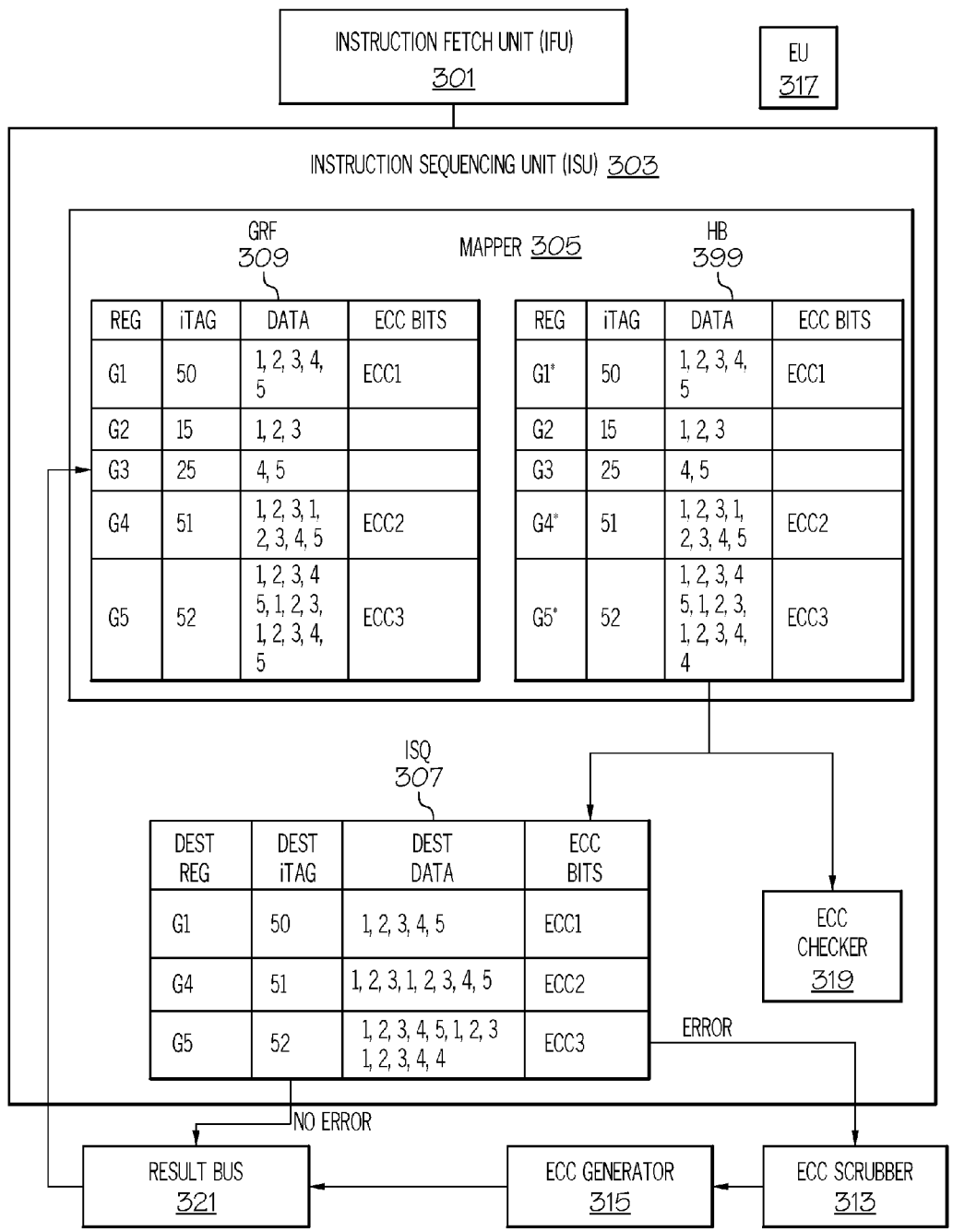
FIG. 3 depicts a simplified version of the processor core shown in FIG. 2 that incorporates novel features of the present invention.

With reference now to FIG. 3, a simplified version of portions of the processor core 105 shown in FIG. 2 is presented showing one or more novel features of the present invention.

An instruction fetch unit (IFU) 301 retrieves instructions to be executed by processor core 105. IFU 301 utilizes one or more of the elements shown in FIG. 2, such as elements 230, 232, and 234.

Once instructions are fetched by IFU 301, they are sequenced by an instruction sequencing unit (ISU) 303, which allows the processor core to execute instructions in sequence and/or out of sequence. ISU 303 includes a mapper 305, an instruction sequencing queue 307, and an ECC checker 319 (discussed below).

Within mapper 305 are multiple general purpose registers (GPRs), depicted in a general register file (GRF) 309 as G1, G2, G3, G4, G5. Each of the GPRs is a physical (hardware) general purpose register (GPR). In a preferred embodiment, there are 32 GPRs identified in GRF 309, although only five GPRs (G1-G5) are depicted for purposes of clarity.

Also part of ISU 303 is a hardware history buffer (HB) 399, which is analogous to HB 299 shown in FIG. 2.

For example, consider the following exemplary instructions:

| 50 | ld1 | G1 ← G2, G3 |
| 51 | ld2 | G4 ← G2, G1 |
| 52 | ld3 | G5 ← G1, G4 |

In the example shown in FIG. 3, instruction 50 loads the contents of GPR G2 (1,2,3) and the contents of GPR G3 (4,5) into GPR G1 (1,2,3,4,5). Instruction 51 loads the contents of GPR G2 (1,2,3) and the contents of GPR G1 (now 1,2,3,4,5) into GPR G4 (1,2,3,1,2,3,4,5). Instruction 52 then loads the current contents of GPR G1 (1,2,3,4,5) and GPR G4 (1,2,3,1,2,3,4,5) into GPR G5 (1,2,3,4,5,1,2,3,1,2,3,4,5). Each of these loads results in corresponding ECC bits (i.e., ECC1, ECC2, and ECC3) being generated by the load and stored in an ECC bits column in the GPRs G1, G4, and G5.

Assume now that other instructions have loaded new content (by executing new instructions) into GPRs G1, G4, and G5. As such, the iTags (i.e., identifiers of instructions 50, 51, and 52), data, and ECC bits associated with GPRs G1, G4, and G5 are loaded into HB 399, which acts as a buffer to supply data needed to reconstruct GPRs G1, G4, and G5 if they are flushed. For purposes of explanation, assume that the contents of GPRs G2 and G3 remain static (i.e., are not flushed or else are already identified in HB 399 as being data generated by executing the instructions identified by iTags 15 and 25.

Also part of ISU 303 is an instruction sequencing queue (ISQ) 307, which issues instructions to execution units within the processor core. In the present invention, however, the ISQ 307 stores not only the instructions (identified by the instruction tags 50, 51, 52), but also stores data that was stored in a particular register before the flush (e.g., data 1,2,3,4,5 in GPR G1) as a result of executing the identified instructions. ISQ 307 also stores error correction bits (e.g., ECC1) that can be used to correct any data errors in the data found in a particular GPR.

For example, assume that the data loaded into HB 399 at the field reserved for GPR G5 holds the incorrect data "1,2,3,4,5,1,2,3,1,2,3,4,4", which should have been "1,2,3,4,5,1,2,3,1,2,3,4,5". ECC checker 319 detects that there is an error in the data from the HB location associated with G5, and directs the ECC scrubber 313 (e.g., an execution unit within the processor core that is devoted to correcting data errors by using ECC correction bits) to correct the data "1,2,3,4,5,1,2,3,1,2,3,4,4" into "1,2,3,4,5,1,2,3,1,2,3,4,5" by using ECC3. Once the corrected data vector ("1,2,3,4,5,1,2,3,1,2,3,4,5") is generated, an ECC generator 315 (e.g., an execution unit within the processor core that is devoted to generating ECC correction bits for data) generates a new set of ECC bits for the corrected data. Thus, the corrected data ("1,2,3,4,5,1,2,3,1,2,3,4,5") and the new ECC correction bits are sent to the GPR G5 via a result bus 321.

However, if the ECC checker 319 determined that a data set is correct (e.g., "1,2,3,4,5" for GPR G1) using ECC1, then that data set and ECC ("1,2,3,4,5" and ECC1) are sent directly to the result bus 321 and on to the GPR G1.

The present invention describes a unique method whereby the History Buffer data is examined on the fly during flush and restore operations, and if an ECC error is detected during the restoring steps, it can signal the Execution Unit to fix up the HB data in-pipe (i.e. while HB data is in its Execution Pipe). This ECC scrubbing and handling process is much more elegant and faster than that found in the prior art.

Figure 4:
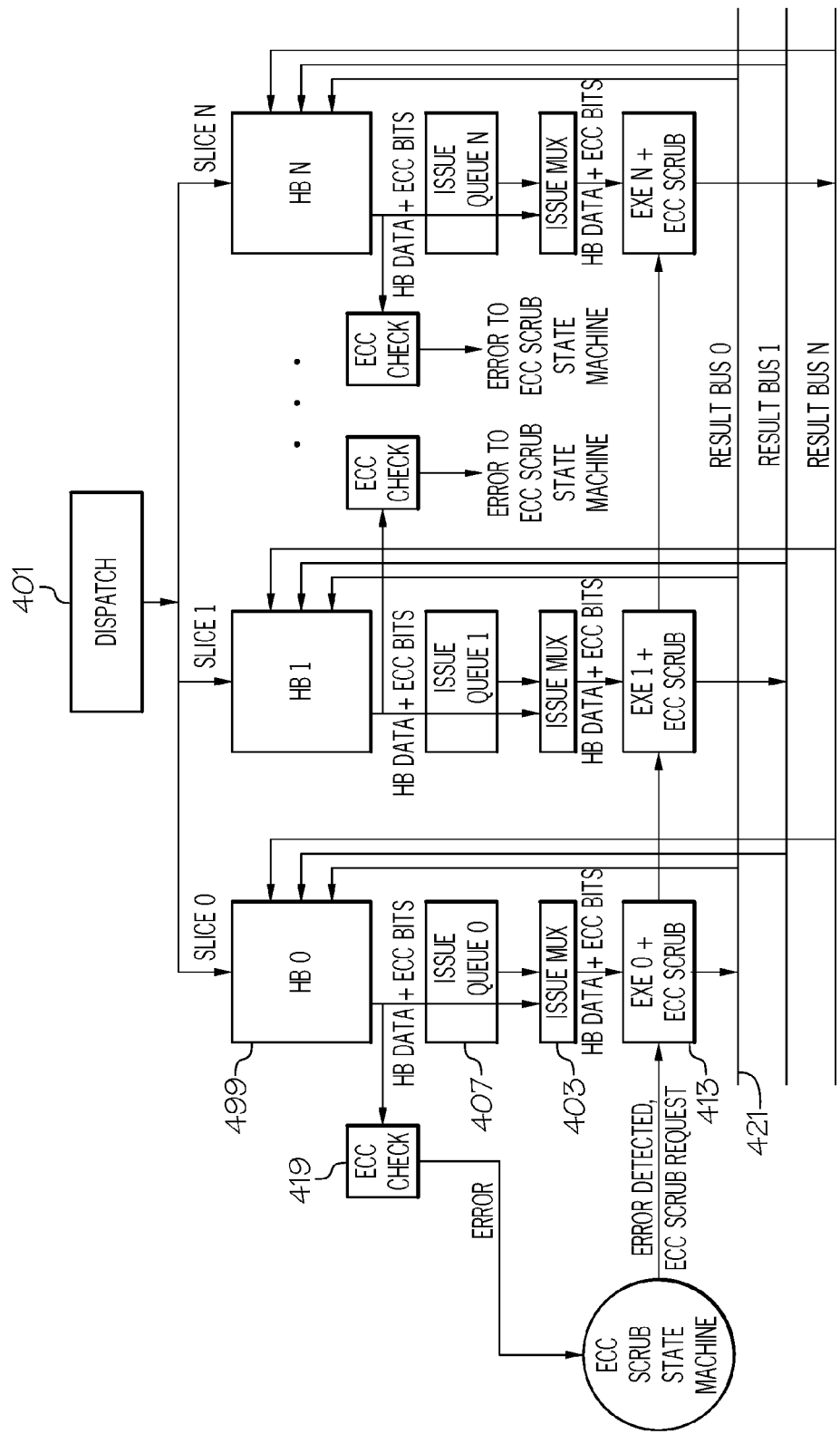
FIG. 4 illustrates another view of the processor core shown in FIG. 3 that incorporates novel features of the present invention.

With reference now to FIG. 4, another view of the processor core shown in FIG. 3 that incorporates novel features of the present invention is presented.

A dispatch 401 (analogous to IFU 301 shown in FIG. 3) issues instructions, including flush and restore instructions, to the processor core, which includes the elements shown in FIG. 4. The dispatch 401 is capable of mapping register content from a set of GPRs (e.g., G1, G2, G3, G4, G5) shown in FIG. 3 to a history buffer 499 (analogous to HB 399 shown in FIG. 3).

The dispatch is also able to direct the HB 499 to send HB data (e.g., as found under the "Data" column in HB 399 shown in FIG. 3) as well as ECC bits (e.g., found under the "ECC bits" column in HB 399 shown in FIG. 3) to an issue Queue 407 (analogous to ISQ 307 shown in FIG. 3) for storage therein. An issue multiplexer (MUX) 403 combines the information in the issue queue (e.g., iTags 50, 51, and 52 shown in ISQ 307 in FIG. 3) for transmission to an execution unit 413 (analogous to the ECC scrubber 313 shown in FIG. 3). Thus, if an ECC checker 419 (analogous to ECC checker 319 in FIG. 3) detects an ECC error in data stored in the HB 499, then the execution unit 413 will correct the data before putting it onto the result bus 0 (i.e., result bus 421, which is analogous to result bus 321 shown in FIG. 3).

Figure 5:
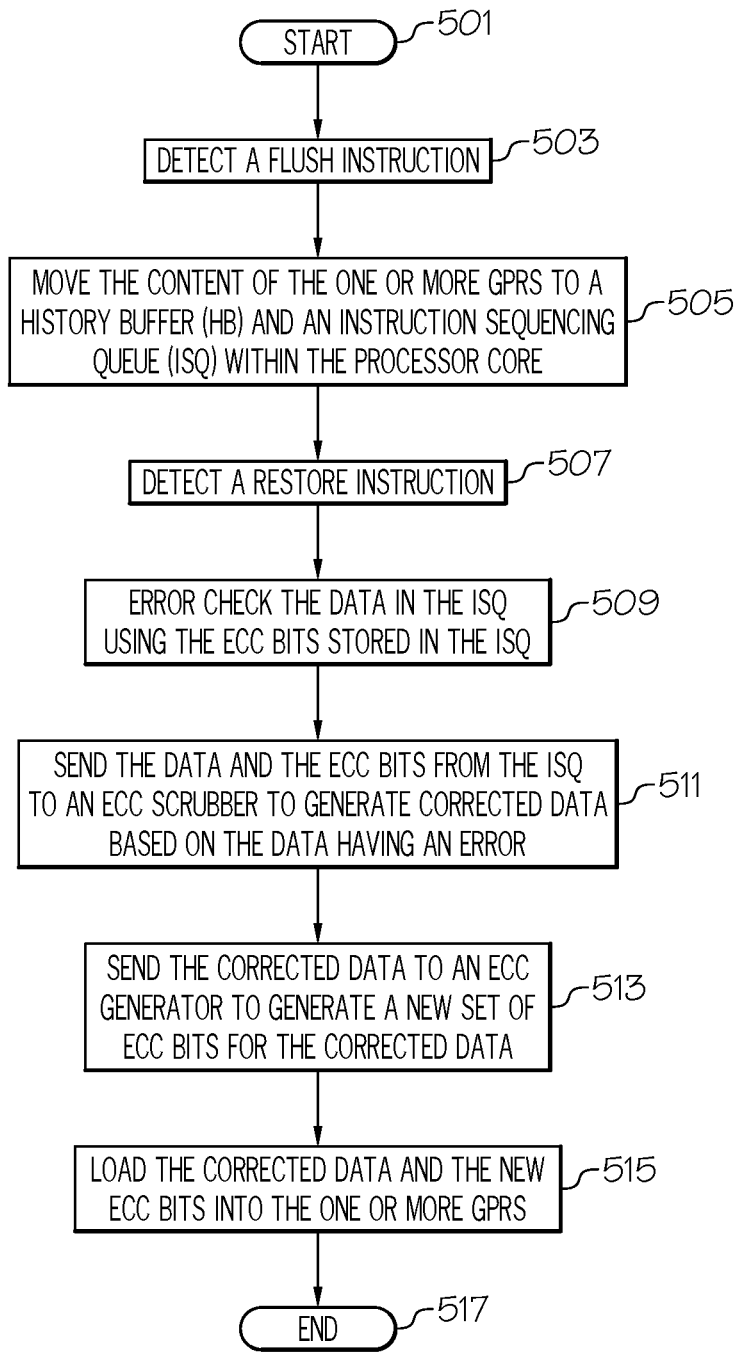
FIG. 5 is a high-level flow chart of exemplary steps taken by hardware devices to correct errors in data found in a history buffer after a general register file flush.

With reference now to FIG. 5, a high-level flow chart of exemplary steps taken by hardware devices to correct errors in data found in a history buffer after a general register file flush is presented. After initiator block 501, a supervisory hardware device (e.g., EU 317 shown in FIG. 3) in a processor core (e.g., processor core 105 shown in FIG. 2) detects a flush instruction (e.g., within the IFU 301 shown in FIG. 3), as described in block 503. This flush instruction, when executed, flushes content of one or more general purpose registers (GPRs) (e.g., GPRs G1, G4, G4 shown in FIG. 3) within the processor core.

As described in block 505, in response to detecting the flush instruction, the supervisory hardware device moves the content of the one or more GPRs to a history buffer (HB) (e.g., HB 399 shown in FIG. 3) and an instruction sequencing queue (ISQ) (e.g., ISQ 307 shown in FIG. 3) within the processor core. As described herein, this content includes data, an instruction tag (iTag) that identifies an instruction that generated the data, and error correction code (ECC) bits for the data (see the contents of GPRs G1, G4, and G5 in the GRF 309 shown in FIG. 3).

As described in block 507, the supervisory hardware device detects a restore instruction (e.g., within the IFU 301 shown in FIG. 3). This restore instruction, when executed, repopulates the one or more GPRs with the content. More specifically, the GPRs that were flushed are the same GPRs that get repopulated.

As described in block 509, in response to detecting the restore instruction, the supervisory hardware device directs an ECC checker device (e.g., ECC checker 319 shown in FIG. 3) to error check the data in the ISQ by using the ECC bits stored in the ISQ (e.g., the ECC bits stored in ISQ 307).

As described in block 511, in response to the ECC checker detecting an error in the data in the ISQ, the supervisory hardware device sends the data and the ECC bits from the ISQ to an ECC scrubber (e.g., ECC scrubber 313 shown in FIG. 3) in order to generate corrected data based on the data having the error. For example, the erroneous data in ISQ 307 (associated with GPR G5) of "1,2,3,4,5,1,2,3,1,2,3,4,4" is corrected, by ECC scrubber 313 using ECC3, into the correct data string of "1,2,3,4,5,1,2,3,1,2,3,4,5".

As described in block 513, the supervisory hardware device sends the corrected data to an ECC generator (e.g., ECC generator 315 shown in FIG. 3), which generates a new set of ECC bits for the corrected data (not shown in the figures).

As described in block 515, the supervisory hardware device then loads the corrected data and the new ECC bits into the corresponding one or more GPRs (i.e., the GPRs that were flushed earlier).

The flow chart ends at terminator block 517.

In an embodiment of the present invention, if the ECC checker 319 determines that the data in the ISQ 307 is error free (e.g., the data associated with GPR G1), then this data is sent directly to the result bus and on to the GPR along with the previous ECC bits. Thus, in response to detecting no error in the data in the ISQ, the supervisory hardware device sends the data and the ECC bits directly to the one or more GPRs via a result bus, such that error-free data bypasses the ECC scrubber.

As described herein and in one embodiment of the present invention, the iTag identifies a load instruction (see exemplary load instructions 50, 51, and 52 above), and the ECC bits are associated with data created by the load instruction. However, in another embodiment, the iTag may identify an add instruction, such that the ECC bits are associated with data created by execution of the add instruction.

In an embodiment of the present invention, the ECC scrubber may determine that the erroneous data cannot be fixed. In this case, the supervisory hardware device will direct the processor core to halt all operations (e.g., flush all registers, remove all data and instructions from issue queues, etc.) in order to prevent an irrecoverable state in the processor core. Thus, after the ECC scrubber determines that the data in the HB 399 and the ISQ 307 is uncorrectable, the supervisory hardware device issues an instruction (e.g., to the IFU 301) to halt all operations in the processor core.

Note that the flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A method comprising:
   detecting, by a supervisory hardware device in a processor core, a flush instruction, wherein the flush instruction, when executed, flushes content of one or more general purpose registers (GPRs) within the processor core;
   in response to detecting the flush instruction, moving, by the supervisory hardware device in the processor core, the content of the one or more GPRs to a history buffer (HB) and an instruction sequencing queue (ISQ) within the processor core, wherein the content comprises data, an instruction tag (iTag) that identifies an instruction that generated the data, and error correction code (ECC) bits for the data;
   detecting, by the supervisory hardware device in the processor core, a restore instruction, wherein the restore instruction, when executed, repopulates the one or more GPRs with the content;

in response to detecting the restore instruction, error checking, by an ECC checker device in the processor core, the data in the ISQ using the ECC bits stored in the ISQ;

in response to the ECC checker detecting an error in the data in the ISQ, sending, by the supervisory hardware device in the processor core, the data and the ECC bits from the ISQ to an ECC scrubber to generate corrected data based on the data having the error;

sending, by the supervisory hardware device in the processor core, the corrected data to an ECC generator, wherein the ECC generator generates a new set of ECC bits for the corrected data; and loading, by the supervisory hardware device in the processor core, the corrected data and the new ECC bits into the one or more GPRs.

2. The method of claim 1, further comprising:

in response to the ECC checker detecting no error in the data in the ISQ, sending, by the supervisory hardware device in the processor core, the data and the ECC bits directly to the one or more GPRs via a result bus, wherein error-free data bypasses the ECC scrubber.

3. The method of claim 1, wherein the iTag identifies an add instruction, and wherein the ECC bits are associated with data created by execution of the add instruction.

4. The method of claim 1, wherein the iTag identifies a load instruction, and wherein the ECC bits are associated with data created by execution of the load instruction.

5. The method of claim 1, further comprising:

determining, by the ECC scrubber, whether the data having the error is uncorrectable; and in response to determining that the data having the error is uncorrectable, issuing, by the supervisory hardware device in the processor core, an instruction to halt all operations in the processor core.

6. A computer program product comprising one or more non-transitory computer readable storage mediums, and program instructions loaded on at least one of the one or more storage mediums, the loaded program instructions comprising:

program instructions to detect a flush instruction, wherein the flush instruction, when executed, flushes content of one or more general purpose registers (GPRs) within the processor core;

program instructions to, in response to detecting the flush instruction, move the content of the one or more GPRs to a history buffer (HB) and an instruction sequencing queue (ISQ) within the processor core, wherein the content comprises data, an instruction tag (iTag) that identifies an instruction that generated the data, and error correction code (ECC) bits for the data;

program instructions to detect a restore instruction, wherein the restore instruction, when executed, repopulates the one or more GPRs with the content;

program instructions to, in response to receiving the restore instruction, error check the data in the ISQ using the ECC bits stored in the ISQ;

program instructions to, in response to detecting an error in the data in the ISQ, send the data and the ECC bits from the ISQ to an ECC scrubber to generate corrected data based on the data having the error;

program instructions to send the corrected data to an ECC generator, wherein the ECC generator generates a new set of ECC bits for the corrected data; and program instructions to load the corrected data and the new ECC bits into the one or more GPRs.

7. The computer program product of claim 6, further comprising:

program instructions to, in response to detecting no error in the data in the ISQ, send the data and the ECC bits directly to the one or more GPRs via a result bus, wherein error-free data bypasses the ECC scrubber.

8. The computer program product of claim 6, wherein the iTag identifies an add instruction, and wherein the ECC bits are associated with data created by execution of the add instruction.

9. The computer program product of claim 6, wherein the iTag identifies a load instruction, and wherein the ECC bits are associated with data created by execution of the load instruction.

10. The computer program product of claim 6, further comprising:

program instructions to determine whether the data having the error is uncorrectable; and program instructions to, in response to determining that the data having the error is uncorrectable, issue an instruction to halt all operations in the processor core.

11. A processor core comprising:

supervisory hardware device;

a set of general purpose registers (GPRs);

a history buffer (HB) mapped to one or more of the GPRs;

an instruction sequencing queue (ISQ);

an error correction code (ECC) scrubber;

an ECC checker; and an ECC generator; wherein the supervisory hardware device:

detects a flush instruction, wherein the flush instruction, when executed, flushes content of one or more of the GPRs within the processor core;

in response to detecting the flush instruction, moves the content of the one or more GPRs to the HB and the ISQ within the processor core, wherein the content comprises data, an instruction tag (iTag) that identifies an instruction that generated the data, and ECC bits for the data;

detects a restore instruction, wherein the restore instruction, when executed, repopulates the one or more GPRs with the content;

in response to detecting the restore instruction, directs an ECC checker to error check the data in the ISQ using the ECC bits stored in the ISQ;

in response to the ECC checker detecting an error in the data in the ISQ, sends the data and the ECC bits from the ISQ to the ECC scrubber to generate corrected data based on the data having the error;

sends the corrected data to the ECC generator, wherein the ECC generator generates a new set of ECC bits for the corrected data; and loads the corrected data and the new ECC bits into the one or more GPRs.

12. The processor core of claim 11, wherein the supervisory hardware device further, in response to the ECC checker detecting no error in the data in the ISQ, sends the data and the ECC bits directly to the one or more GPRs via a result bus, wherein error-free data bypasses the ECC scrubber.

13. The processor core of claim 11, wherein the iTag identifies an add instruction, and wherein the ECC bits are associated with data created by execution of the add instruction.

14. The processor core of claim 11, wherein the iTag identifies a load instruction, and wherein the ECC bits are associated with data created by execution of the load instruction.

15. The processor core of claim 11, wherein the ECC scrubber further:
- determines whether the data having the error is uncorrectable; and
- in response to determining that the data having the error is uncorrectable, issues an instruction to halt all operations in the processor core.

* * * * *